United States Patent [19]

Schubert et al.

[11] Patent Number: 5,531,149
[45] Date of Patent: Jul. 2, 1996

[54] ANTI-CAR JACKING DEVICE

[76] Inventors: David P. Schubert, 447 Riverside Ave., Lyndhurst, N.J. 07071; Patrick J. O'Neil, 62 Patton Ave., Princeton, N.J. 08540

[21] Appl. No.: 155,711

[22] Filed: Feb. 15, 1994

[51] Int. Cl.$^6$ ............................ F41B 15/00; B60R 27/00; G08B 15/00
[52] U.S. Cl. ................... 89/1.14; 42/1.13; 43/78
[58] Field of Search ..................... 89/1.11, 1.14; 42/1.13; 43/78

[56] References Cited

U.S. PATENT DOCUMENTS

| | | | |
|---|---|---|---|
| 2,009,026 | 7/1935 | Searle | 299/30 |
| 2,011,120 | 8/1935 | Searle | 299/95 |
| 2,094,261 | 9/1937 | Burley | 299/30 |
| 2,191,570 | 2/1940 | Lewis | 43/78 |
| 3,411,401 | 11/1968 | Harris | 89/1.11 |
| 3,661,115 | 5/1972 | Rosenstein | 42/1.13 |
| 5,182,541 | 1/1993 | Bajorek et al. | 340/428 |
| 5,318,147 | 6/1994 | Maietski | 180/287 |

*Primary Examiner*—Charles T. Jordan
*Assistant Examiner*—Theresa M. Wesson

[57] ABSTRACT

An anti-car jacking device operable by either a driver or a passenger and mounted on the car's undercarriage. The device employs a solid rod telescopically mounted in an outer cylinder pivotably mounted on a base plate. The outer cylinder and rod are restrained in place by a restraining device until activated by either mechanical or electrical means. When activated, the rod and cylinder rotate about a pivot bolt and the rod extends outwardly of the cylinder by centrifugal force. While extending and rotating the solid rod will strike the legs of a would-be car jacker.

9 Claims, 7 Drawing Sheets

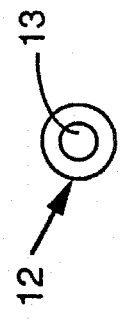
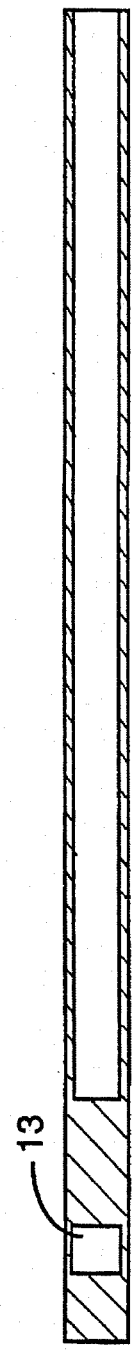
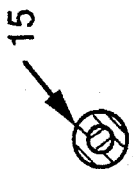

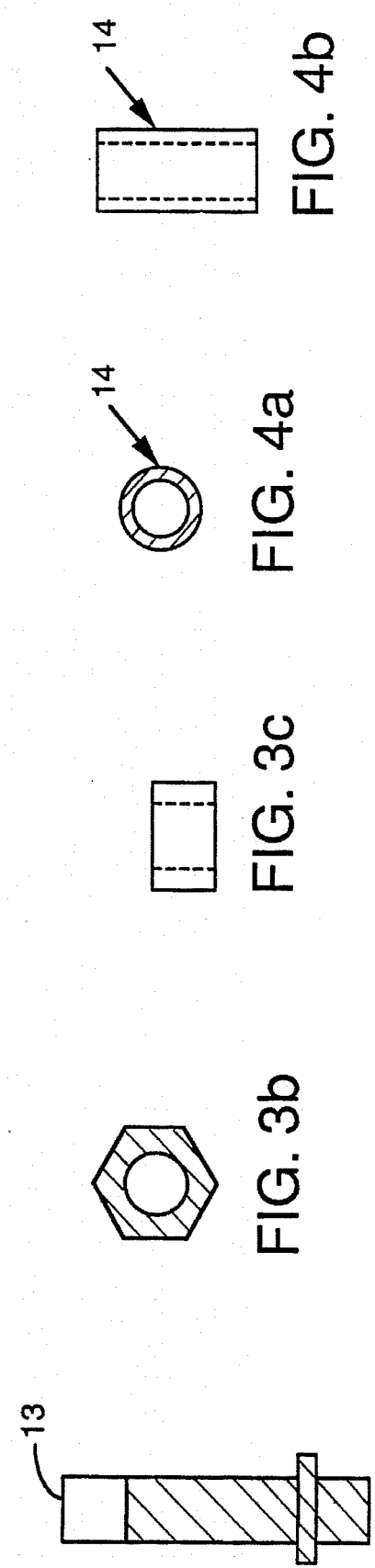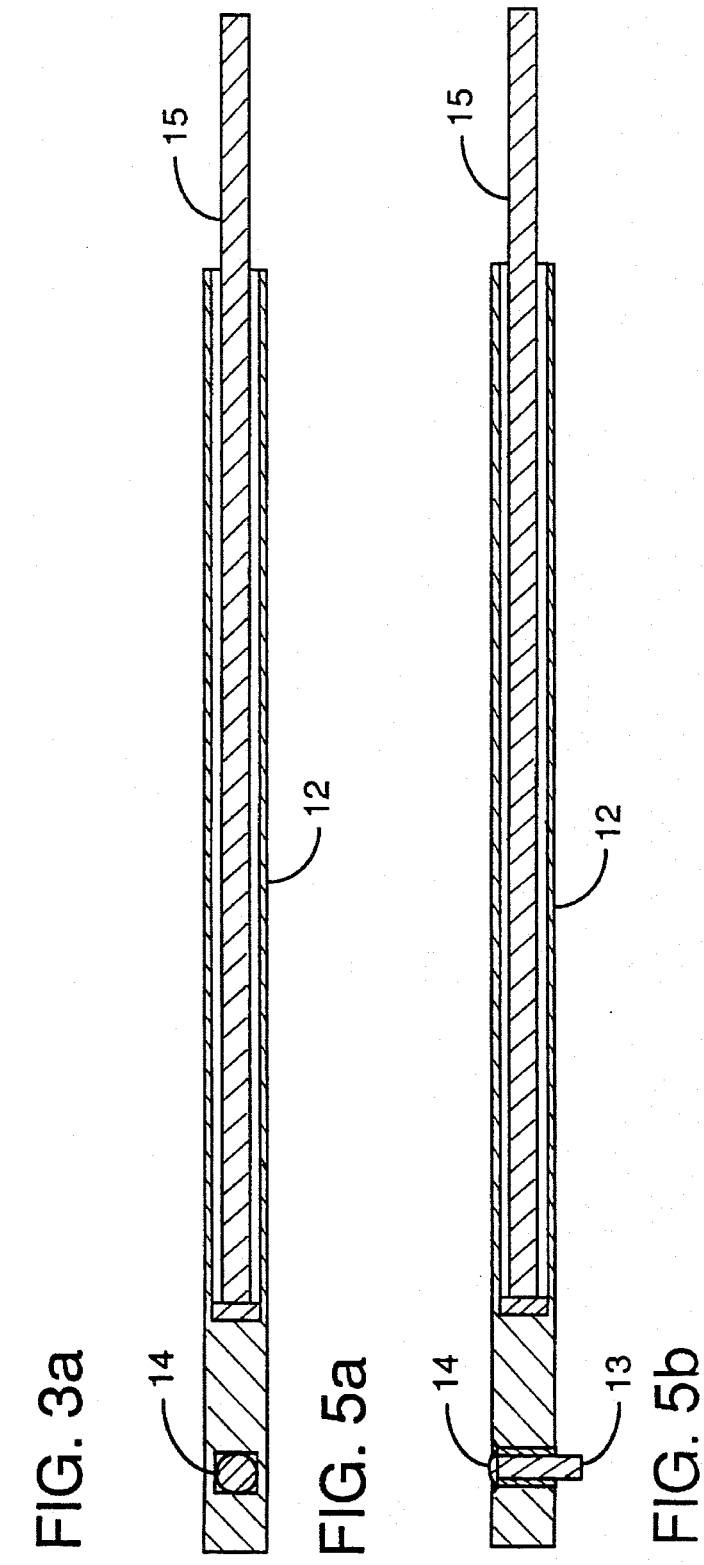

FIG. 13a
FIG. 13b
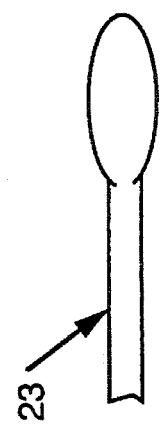
FIG. 14a
FIG. 14b
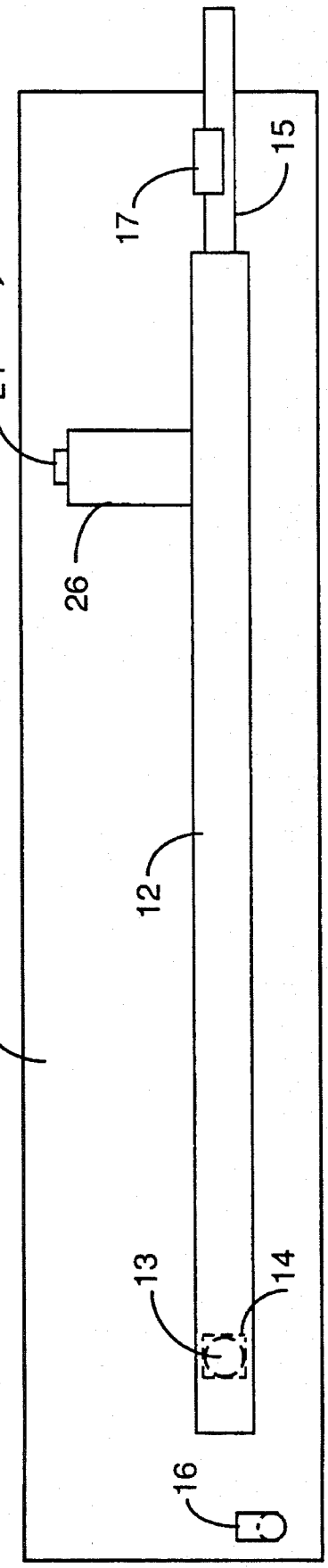
FIG. 15

ANTI-CAR JACKING DEVICE

BACKGROUND OF INVENTION

1. Field of the Invention

The present invention generally involves the field of technology pertaining to a device to be mounted, preferably, to the undercarriage of an automobile, on either the driver or passenger side for striking and disabling a would-be car jacker. When the automobile operator or passenger is in a threatening situation from a person standing outside the car the person threatened can activate, either mechanically or electrically, a device which will strike the legs of the would-be car jacker thereby at least temporarily incapacitating them.

In general, the device comprises a base plate for undercarriage attachment to an automobile, an outer hollow cylinder pivotably mounted to the base plate, a solid rod telescopically disposed in the outer cylinder and rotatable therewith and restraining and activating means for pivoting the hollow cylinder and solid rod about a pivot bolt when the device is activated by either the driver or a passenger.

The solid rod, after extending from the hollow outer cylinder by centrifugal force, caused by the rotation of the outer hollow cylinder about the pivot bolt, will strike the legs to incapacitate the would-be car jacker.

In either the mechanical or electrically fired or activated device, the cylinder and rod are restrained from rotation when the device is not in use by a base plate mounted restraining means holding the solid rod until released.

The mechanically activated device essentially comprises a leaf spring and driver or passenger activated cable mechanism comprising a length of wire cable, a cotter pin, and a snap link disposed between the cable and cotter key.

The electrically activated device essentially comprises a container or cylinder housing a compressed gas or explosive propellant which can be fired by a 6 V.DC current.

2. Description of the Prior Art

A search of the prior art has uncovered the following patents: U.S. Pat. Nos. 2,009,026 to G. Searle; 2,011,120 to G. Searle; 2,094,261 to E. L. Burley; 5,182,541 to Bajorek, et al.; and 5,318,147 to Maifski.

Searle U.S. Pat. No. 2,009,026 relates to a protective device for automobiles. This patent teaches the use of a plurality of motor vehicle mounted spotlights having means for supplying coloring matter and acid to nozzles operatively associated with the spotlights and therfore is substantially different both in concept and structure from the instant invention.

The U.S. Pat. No. 2,094,261 to Burley relates to a bandit protective device for autmobiles comprising means for storing and discharging fluid to be discharged at a bandit and does not teach the mechanical means of the telescoping rod as disclosed by the applicant for the instant invention.

U.S. Pat. No. 2,011,120 to Searle relates to a protective device for enclosures in general and banks and automobiles in particular. The patent also teaches the use of nozzles for dispensing gas or liquids and not the mechanical device of the instant invention.

The Bajorek, et al. U.S. Pat. No. 5,182,541 relates to a remote controlled theft deterrent system electrically operated to emit a noxious gas upon unauthorized entry.

Maifski, U.S. Pat. No. 5,318,147 discloses a nozzle mounted adjacent to an automobile driver's door for dispensing a disabling fluid. The device is activated by means of a remote control switch operated from the driver's seat.

None of the above references teaches or even suggests the use of a solid metal rod telescopically mounted in a rotatably mounted outer cylinder which is restrained from rotation until mechanical or electrical activation wherein the solid metal rod is caused to extend from the outer hollow cylinder, by means of centrifugal force, striking a would-be car jacker.

SUMMARY OF THE INVENTION

According to the present invention an automobile undercarriage mounted device is provided to thwart would-be car jackers.

A telescoping solid metal rod is disposed internally of a hollow cylinder which is mounted on a base plate which in turn is mounted on the undercarriage of an automobile and can be mounted on either the driver or passenger side.

The hollow cylinder is rotatably or pivotably mounted to the base plate by means of a pivot bolt and a pivot bolt sleeve fits over the pivot bolt to reduce friction between the bolt and the cylinder during rotation.

Further, a rubber coated steel stop is affixed to the base plate to prevent the rotating deployed rod from striking the front tires of the vehicle.

Retainers are provided to prevent rotation of the solid metal rod and outer hollow cylinder until it is desired to activate the device as will be more fully described. These restraining means are employed when the automobile is moving.

There are two general methods or means of providing rotational force to the outer cylinder and rod, a mechanical means and an electrical means.

In the mechanical method of rotatably deploying the device a leaf spring bearing on the cylinder is used. A driver activated cable and cotter key is pulled by the operator thereby releasing the restraining means and allowing the leaf spring to bear against the cylinder causing it to begin rotation.

In the electrical method, compressed gas or an explosive cartridge is electrically fired with the current being provided by the automobile electrical system. This action releases the restraining device allowing the cylinder and rod to rotate.

In either method of initiating rotation the outer hollow cylinder and telescoping solid rod rotate about the pivot bolt and the rod is caused to extend outwardly of the cylinder by means of centrifugal force until it either strikes the would-be car jacker or contacts the stop means.

The extension of the rod from the cylinder during rotation may be assisted by using a power bleed from the source of propulsion.

It should be obvious that the device can be used in environments other than an automobile such as at a bank teller's window or the like.

It is therefore an object of the invention to provide a device to incapacitate or disable a car jacker or other criminal.

It is another object of the invention to provide an anti car jacking device wherein the disabling means is a telescoping solid rod.

It is a further object of the invention to provide such an anti-car jacking device wherein the solid rod telescopes into and out of a hollow outer cylinder which is rotateably secured to a base plate.

It is still a further object of the invention to provide such a disabling device wherein the base plate is mounted to the undercarriage of an automobile.

It is yet a further object of the invention to provide such an anti-car jacking device wherein rotation of the outer cylinder and the telescoping solid metal rod about the pivot bolt is initiated either by mechanical or electrical means.

These and further objects, features and advantages of the invention shall become apparent from the following detailed description of a preferred embodiment thereof when taken in conjunction with the drawings wherein like reference characters refer to corresponding parts in the several views.

BRIEF DESCRIPTION OF THE DRAWINGS

FIG. 1 is a longitudinal cross sectional view of the outer hollow cylinder.

FIG. 2 is a longitudinal cross sectional view of the inner solid metal rod.

FIG. 3 is a cross sectional view of the pivot bolt.

FIG. 4 is a cross sectional view of the pivot bolt sleeve.

FIG. 5 is an assembled view, in cross section, of FIGS. 1–4.

FIG. 13 is a cross sectional view of the cable guide.

FIG. 14 is a cross sectional view of the cable mechanism comprising a cotter key, flexible cable, and snap link.

FIG. 15 is a cross sectional assembled top view of the embodiment of the invention having an electrical firing mechanism.

DETAILED DESCRIPTION OF THE PREFERRED EMBODIMENT

Figure 6A:
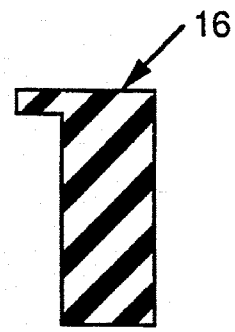
FIG. 6 is a cross sectional view of the arm stop.
Figure 6B:
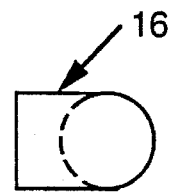

A device to be mounted on an automobile undercarriage, which, when activated, can disable a would-be car jacker will now be described with reference to FIGS. 1–18 of the drawings.

The device, shown generally as 10 in FIGS. 15—18, comprises a base plate 11 having pivotably mounted thereon a hollow outer cylinder 12 by means of a pivot bolt 13. A pivot bolt sleeve 14, shown in FIG. 4, fits over the pivot bolt 13 to reduce friction between the bolt and cylinder 12 during rotation.

A solid rod 15 is telescopicaly disposed in outer cylinder 12 and rotates therewith when the system is activated. When the outer cylinder and therefore the solid rod are caused to rotate about the pivot bolt the solid rod is caused to extend outwardly of the hollow cylinder by centrifugal force until it strikes the legs of a would-be car jacker. If the rod does not contact the car jacker it will be prevented from further rotation by contacting a stop 16 mounted on base plate 11 and shown in FIG. 6 and FIGS. 15–18.

Figure 7A:
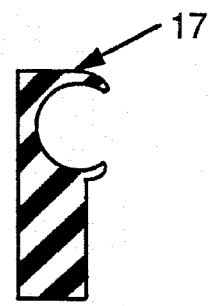
FIG. 7 is a cross sectional view of a retainer for the electrically fired embodiment.
Figure 7B:
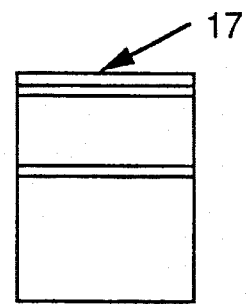
Figure 8A:
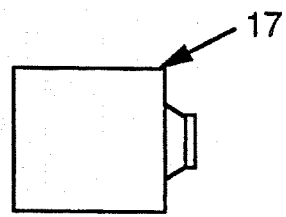
FIG. 8 is a cross sectional view of a retainer for the mechanically fired embodiment.
Figure 8B:
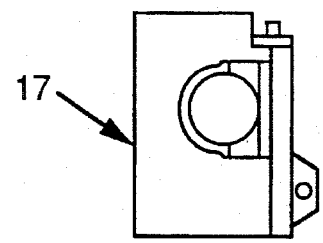
Figure 8C:
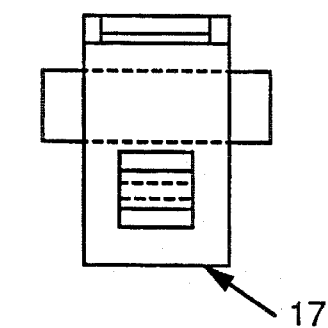

A restrainer 17, of any suitable kind, such as shown in FIGS. 7 and 8, is also mounted on base plate 11 and is attached to solid rod 15 by any suitable means, as shown in FIGS. 15–18, to prevent premature rotation of the solid rod and outer hollow cylinder.

The restrainer can be released and the hollow cylinder and telescopicly mounted solid rod can begin rotation about the pivot bolt upon activation of a propulsion device.

Figure 9A:
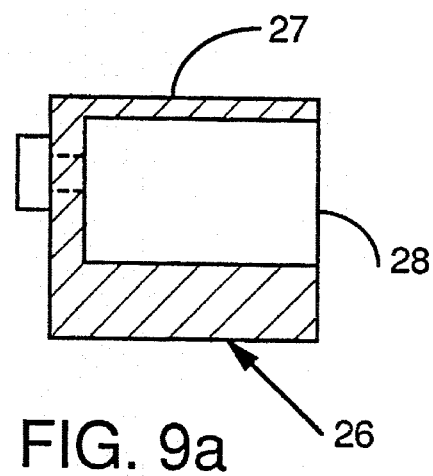
FIG. 9 is a cross sectional view of the electrical firing embodiment.
Figure 9B:
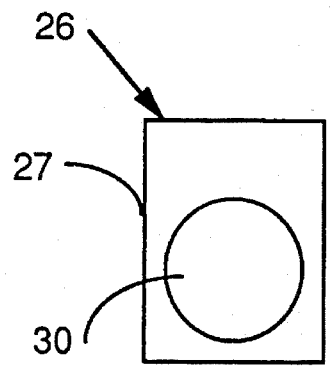
Figure 11A:
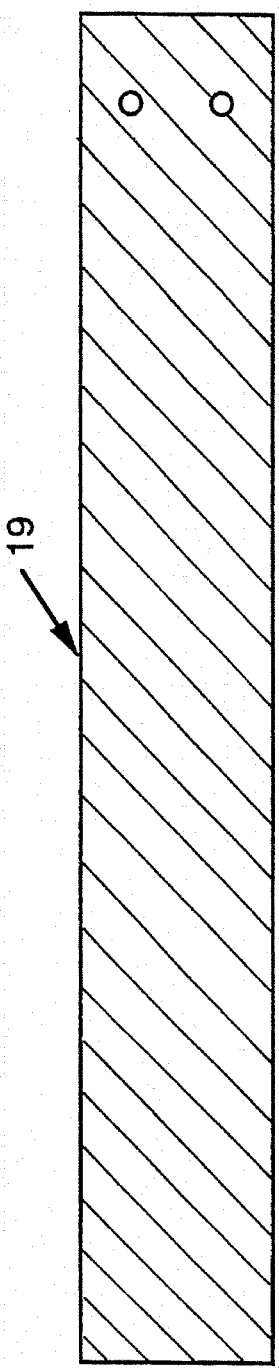
FIG. 11 is a longitudinal cross sectional view of the mechanical spring firing mechanism.
Figure 11B:

There are two basic propulsion devices shown; a mechanical device as shown in FIG. 11 and an electrical device as shown in FIG. 9. Both are shown assembled on the base plate in FIGS. 15–18.

Figure 10A:
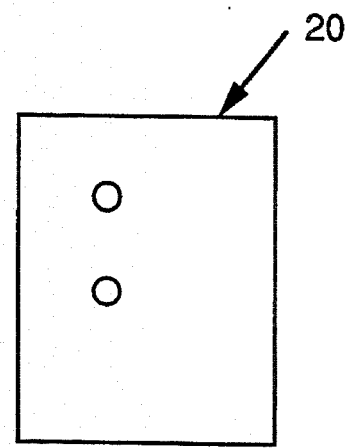
FIG. 10 is a front, side and top view, in cross section, of the spring retainer for the mechanical firing mechanism.
Figure 10B:
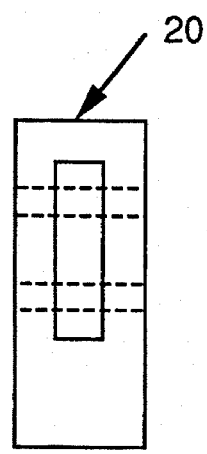
Figure 10C:
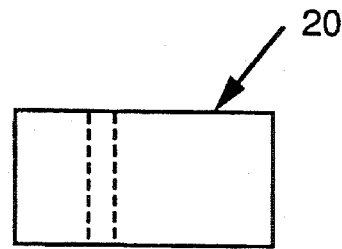
Figure 12A:
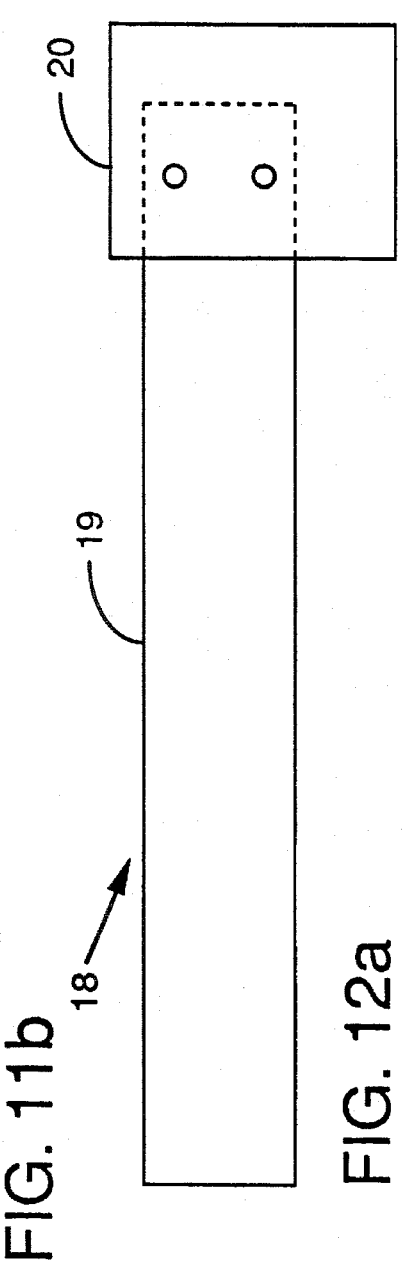
FIG. 12 is a cross sectional side and top view of FIGS. 10 and 11 assembled.
Figure 12B:
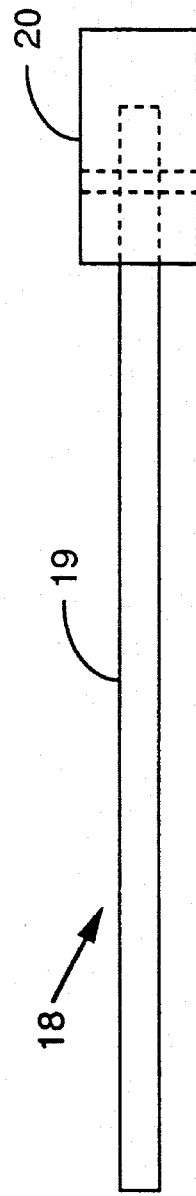
Figure 17:
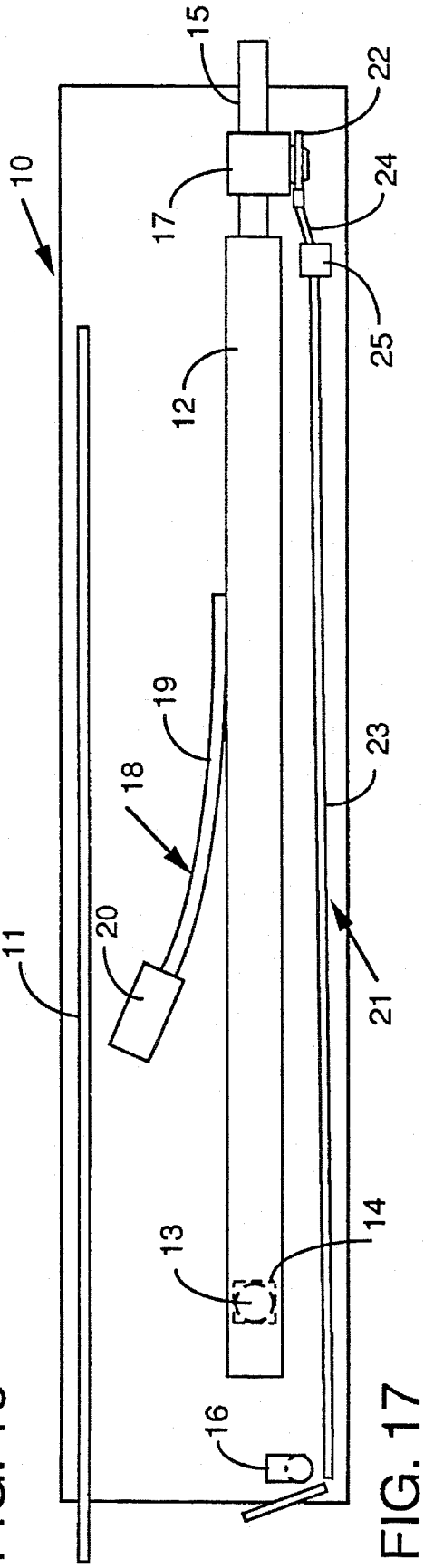
FIG. 17 is a cross sectional assembled top view of the embodiment of the invention having a mechanical firing mechanism.
Figure 18:
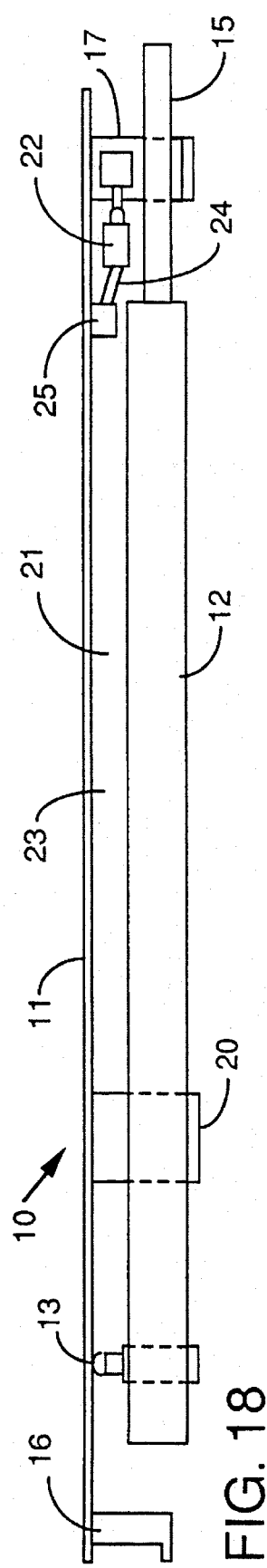
FIG. 18 is a side view of FIG. 17.

The mechanically activated propulsion means is shown generally at 18 in FIG. 17 and more specifically in FIGS. 11 and 12 and comprises a leaf spring 19 mounted on base plate 11 and is seen to be in contact with the hollow outer cylinder 12 and restrained by means of a leaf spring retainer 20 shown generally in FIGS. 17 and 18 and specifically in FIGS. 10 and 12.

When the leaf spring retainer is released and the rod restraining means is released the leaf spring 19 causes the hollow cylinder and therefore the solid rod to rotate about the pivot bolt.

In this embodiment the leaf spring 19 retainer 20 is released by means of a driver or passenger operated cable mechanism shown as 21 in FIGS. 17 and 18 and more specifically in FIG. 14. This mechanism comprises a cotter key 22, flexible cable 23 and a snap link 24 disposed between the cotter key and cable. One end of the cotter key is operatively attached to restrainer 17 and the other to one end of snap link 24. The other end of the snap link is attached to the flexible cable 23 all as seen in FIG. 14.

When a person pulls on a free end of the flexible cable 23 the cotter key is pulled from the restrainer 17 and the restrainer is thereby released from the solid rod 15 thereby allowing it and the outer cylinder 12 to rotate about pivot bolt 13. Any suitable cable guide 25 such as shown in FIG. 13 can be mounted on base plate 11 to prevent the cable from engaging the ground after it is pulled.

Figure 16:
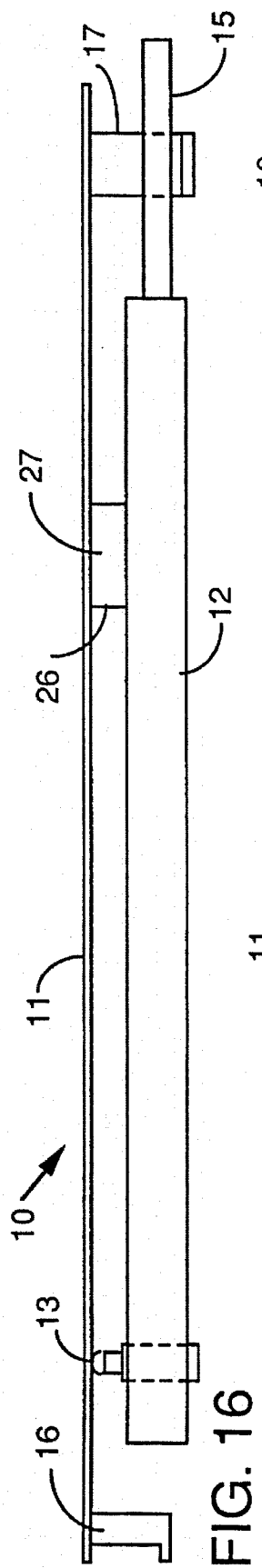
FIG. 16 is a side view of FIG. 15.

The electrically activated propulsion means is shown generally at 26 in FIGS. 15 and 16 and more specifically in FIG. 9 and comprises a container 27 and breech mechanism 28 with a firing contact 29 all mounted on base plate 11 and in contact with the outer cylinder 12 as seen in FIGS. 15 and 16.

An explosive propellant 30, activated by an electrical current, is housed in container 17. In the alternative a compressed gas container can be housed in the container. When either substance is detonated or released the outer cylinder and solid rod rotate.

In operation, for either the mechanical or electricaly activated device, the base plate is mounted to the undercarriage of an automobile and the hollow outer cylinder and solid rod are held in place by a restrainer. When the restrainer is released, by either means, the cylinder begins to rotate and the solid rod extends outwardly of the cylinder by means of centrifugal force. When the rod either strikes the would be car jacker or the base mounted stop it will stop rotating.

Though the invention has been described and illustrated with reference to a preferred embodiment thereof, those skilled in the art will appreciate that various changes and modifications in shape, size, composition and arrangement of parts may be resorted to without departing from the spirit of the invention or scope of the subjoined claims.

What is claimed is:

1. An anti-car jacking device comprising:
   (a) a base plate;
   (b) a hollow outer cylinder pivotably mounted on said base plate;
   (c) a solid rod telescopically disposed in said hollow outer cylinder;
   (d) stop means disposed on said base plate for stopping the pivoting of said hollow outer cylinder;
   (e) restraining means mounted on said base plate and operatively associated with said solid rod for restraining rotation of said solid rod and said hollow outer cylinder; and
   (f) propulsion means operatively associated with said restraining means for releasing said solid rod and initating rotation of said hollow outer cylinder and said solid rod about a pivot bolt, whereby when said propulsion means is activated said solid rod is released from said restraining means, said outer cylinder and said solid rod rotate, said solid rod telescopes by centrifugal force out of said hollow outer cylinder until said solid rod engages a car jacker or said stop means.

2. The anti-car jacking device of claim 1 wherein said propulsion means is mechanically activated.

3. The anti-car jacking device of claim 1 wherein said propulsion means is electrically activated.

4. The anti-car jacking device of claim 2 wherein said mechanically activated propulsion means is a leaf spring mounted on said base plate and in contact with said hollow cylinder and restrained by a leaf spring retainer mounted on said base plate whereby when said leaf spring retainer is released and said restraining means is released said leaf spring causes said hollow cylinder to rotate about said pivot bolt.

5. The anti-car jacking device of claim 4 wherein said restraining means is released by a driver operated cable mechanism comprising a length of wire cable, a cotter key and a snap link disposed between said wire cable, and said cotter key whereby when said wire cable is pulled by a driver said cotter key is pulled from said restraining means thereby releasing said solid rod.

6. The anti-car jacking device of claim 5 wherein said cable mechanism is attached to said base plate by means of a cable guide which prevents said cable from engaging the ground.

7. The anti-car jacking device of claim 3 wherein said electrically activated propulsion means is a container and breech mechanism mounted on said base plate and in contact with said outer cylinder whereby when said propulsion means is activated said outer cylinder is caused to rotate.

8. The anti-car jacking device of claim 7 wherein said container houses an explosive propellant activated by an electrical current.

9. The anti-car jacking device of claim 7 wherein said container houses a compressed gas container.

* * * * *